United States Patent
Shibuya et al.

(10) Patent No.: US 6,245,166 B1
(45) Date of Patent: Jun. 12, 2001

(54) MATERIAL FOR SLIDING CONTACT, COMPOSITE CLAD MATERIAL, AND SMALL-SIZED DIRECT CURRENT MOTOR USING THE SAME

(75) Inventors: Isao Shibuya; Keiji Nakamura; Kenji Shiraki, all of Chiba; Toshiya Yamamoto; Takao Asada, both of Kanagawa, all of (JP)

(73) Assignees: Mabuchi Motor Co., Ltd, Chiba; Tanaka Kikinozoku Kogyo K.K., Tokyo, both of (JP)

( * ) Notice: Subject to any disclaimer, the term of this patent is extended or adjusted under 35 U.S.C. 154(b) by 0 days.

(21) Appl. No.: 09/242,607

(22) PCT Filed: Jun. 26, 1998

(86) PCT No.: PCT/JP98/02888

§ 371 Date: Dec. 21, 1999

§ 102(e) Date: Dec. 21, 1999

(87) PCT Pub. No.: WO99/01584

PCT Pub. Date: Jan. 14, 1999

(30) Foreign Application Priority Data

Jul. 2, 1997 (JP) .................................................. 9-191940

(51) Int. Cl.$^7$ ................................ C22C 5/06; C22F 1/14; H01H 1/02; H01R 39/08
(52) U.S. Cl. .......................... 148/431; 420/504; 420/506; 310/233; 428/615; 428/672; 428/673; 428/674; 428/929
(58) Field of Search ..................................... 310/219, 233, 310/234, 235, 236, 237, 228; 148/5–38, 431; 428/614, 615, 672, 673, 674, 929; 420/504, 506

(56) References Cited

U.S. PATENT DOCUMENTS

| 5,338,618 | * | 8/1994 | Suzuki et al. | 428/614 |
| 5,972,131 | * | 10/1999 | Asada et al. | 148/430 |

FOREIGN PATENT DOCUMENTS

| 53003920 | * | 1/1978 | (JP) . |
| 56-130094 |  | 10/1981 | (JP) . |
| 58-104136 |  | 6/1983 | (JP) . |
| 62235445 | * | 10/1987 | (JP) . |
| 6235034 | * | 8/1994 | (JP) . |

* cited by examiner

*Primary Examiner*—Sikyin Ip
(74) *Attorney, Agent, or Firm*—Jordan and Hamburg LLP

(57) ABSTRACT

An object of the present invention is to provide a material for a sliding contact whose alloy composition does not contain an environmentally detrimental substance such as Cd, which exhibits excellent contact resistance, whose electrical functions are good and free of time-course variation, and which further exhibits excellent wear resistance. The material for a sliding contact assumes the form of an Ag—Zn—Pd, Ag—Zn—Pd—Cu, Ag—Zn—Pd—Ni, or Ag—Zn—Pd—Cu—Ni alloy. In the compositions of these alloys, the Zn content is 0.1–3.0% by weight, the Pd content is 0.1–1.5% by weight, and the balance is Ag. When Cu is contained, the Cu content is 0.1–3.0% by weight. When Ni is contained, the Ni content is 0.01–0.5% by weight. Zn, Pd, and Cu are present in the Ag α phase in the form of solid solution. Ni particles are finely dispersed in the alloys. A composite clad material is formed through use of the material for a sliding contact. A commutator manufactured through use of the composite clad material is incorporated into a small-sized direct current motor used in a household electrical appliance.

15 Claims, 1 Drawing Sheet

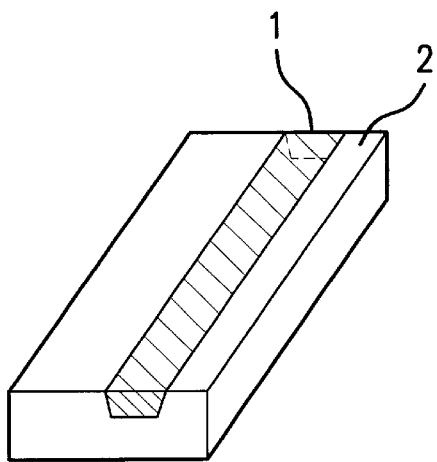
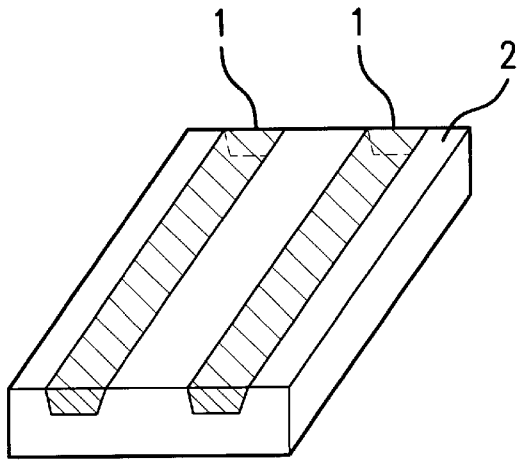
FIG.1A  FIG.1B
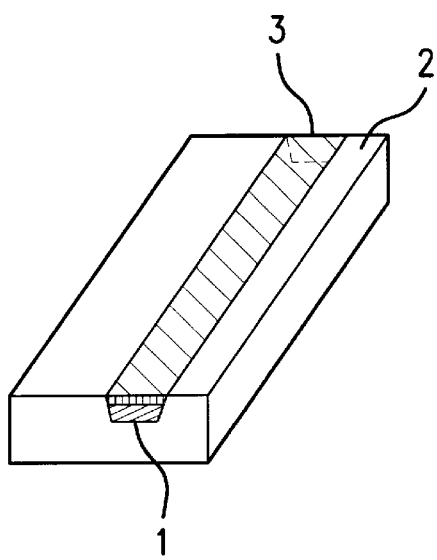
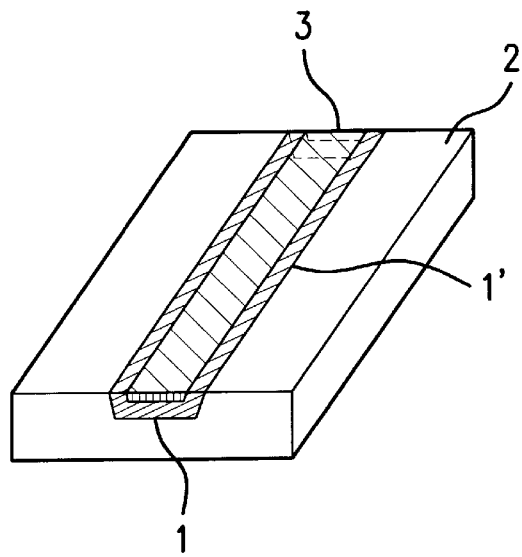
FIG.2A  FIG.2B

MATERIAL FOR SLIDING CONTACT, COMPOSITE CLAD MATERIAL, AND SMALL-SIZED DIRECT CURRENT MOTOR USING THE SAME

BACKGROUND OF THE INVENTION

The present invention relates to a material for a sliding contact to be used in an electrical, mechanically sliding element. More particularly, the invention relates to a material for a sliding contact to be used for a commutator of a small-sized direct current motor which, in turn, is used in a household electrical appliance driven on a rechargeable battery (or an earth ring, a rotary switch, or a like element).

Recently, in the above technical field, research efforts have been intensively carried out in an attempt to develop new materials for a sliding contact. A most significant subject in relation to development of a material for a sliding contact (hereinafter referred to as a sliding-contact material) is to realize ideal wear and low contact resistance when the material is applied to a contact. Low contact resistance of a sliding-contact material is realized by not only high electrical conductivity of the material but also secure or close contact between materials that contact. However, in the case where the contacting materials slide on each other, frictional resistance increases with the degree of contact between the contacting materials. Sliding against such friction causes a conspicuous wear phenomenon. Thus, there cannot be obtained a sliding-contact material that exhibits ideal characteristics unless the above contradictory phenomena are controlled. The wear phenomenon of a sliding contact involves many factors which are not yet scientifically solved; thus, control of the wear phenomenon is said to be very difficult to achieve through the improvement of a sliding-contact material.

Wear on a sliding-contact material is roughly classified into adhesive wear and scratch wear. Generally, even when the surface of a sliding-contact material is finished to a considerably high degree of smoothness, the surface is not a perfect plane on a microscopic scale, but has many fine pits and projections. Such metallic surfaces, when brought into contact with each other, appear to contact over a wide area. However, in actuality, only fine projections present on the surfaces are in contact with each other. Thus, a so-called true contact area is smaller than an apparent contact area. Accordingly, a large pressure is imposed on the true contact portion, i.e., on contacting projections, causing fusion between the contacting metals. As a result, a softer metal is torn of f and transfers onto the other harder metal; that is, adhesive wear occurs. When materials having different hardnesses are in contact with each other or with soft metals, either of which makes hard contact with each other, hard metal mechanically shears soft metal, causing scratch wear.

Such a wear phenomenon depends on the hardness of contacting metallic materials and the state of engagement of the metallic materials. Basically, a wear phenomenon of a sliding-contact material grows in proportion to contact pressure and becomes less intensive with hardening of material. However, the wear phenomenon changes greatly depending on a temperature during contact, variation in humidity, and the presence of a corrosive component, organic vapor, dust, or a like substance. Such change in the wear phenomenon is variation in the state of contact at a contact portion and thus induces an increase in contact resistance, thus significantly affecting stable maintenance of low contact resistance.

In the case of a small-sized direct current motor whose commutator is of a composite clad material using a sliding-contact material, the above-mentioned wear phenomenon occurs between the commutator and a brush when the motor runs at high speed. Specifically, being subjected to contact friction over a long period of time and frictional heat induced by sliding, a sliding-contact material, which constitutes the commutator, suffers adhesive wear and scratch wear simultaneously. As a result, the surface of the sliding-contact material is grated, thereby generating wear powder. The thus-generated wear powder causes an increase in contact resistance, becomes caught in gaps of the commutator to thereby cause a short circuit, or cause noise.

In the case of a composite clad material using a sliding-contact material, the progress of such a wear phenomenon causes destruction of metal provided in a surface layer of the composite clad material, i.e., destruction of the sliding-contact material. As a result, wear reaches a base material located under the sliding-contact material; that is, the base material, which oxidizes easily, is exposed. A metallic oxide generated through oxidation of the base material may cause various electrical problems. Therefore, when a two-layer or three-layer composite clad material is to be used as a commutator, the improvement of an alloy material constituting each layer is a very important task to undertake.

Examples of materials recently used for a commutator for a small-sized direct current motor used in a household electrical appliance driven on a rechargeable battery, i.e., examples of a sliding-contact material, include a two-layer composite clad material (for example, Ag99—Cd1/Cu) that uses as a surface layer a Ag—Cd alloy containing 1–2% by weight Cd and the balance Ag and uses as a base layer Cu or a Cu alloy; and a two-layer composite clad material (for example, Ag97.7-Cd2-Ni0.3/Cu) that uses as a surface layer an Ag—Cd—Ni alloy containing 1–2% by weight Cd, 0.01–0.7% by weight Ni, and the balance Ag and uses as a base layer Cu or a Cu alloy. The above parenthesized expression "[alloy composition]/Cu" denotes a two-layer composite clad material, and the symbol "/" denotes the boundary between a surface layer and a base layer. In the expression "[alloy composition]/Cu," a number appearing after a component element of the alloy composition is a value in the unit of % by weight.

Such Ag—Cd and Ag—Cd—Ni alloys exhibit excellent electrical functions, hardness, and contact resistance. For example, Japanese Patent Publication No. 2-60745 discloses a Ag alloy serving as a sliding-contact material for a commutator of a small-sized direct current motor. The Ag alloy contains Sn and/or Cd in a total amount of 1–5% by weight and the balance Ag. However, since Cd is a detrimental substance in terms of effects on environment, manufacture or use of a sliding-contact material containing Cd is not preferred.

Other alloys serving as sliding-contact materials include Ag—Cu and Ag—Cu—Cd. However, these materials have a problem in that contact resistance is low at an early stage of use but exhibits time-course variation, resulting in deterioration in product value for electric razors and like products using a rechargeable battery. Specifically, when a motor employs such an alloy as a sliding-contact material, an increase in contact resistance results from time-course variation, causing an increase in motor starting voltage. Accordingly, the electromotive force of a battery decreases; consequently, the motor does not start up. As a result, the frequency of battery recharge increases, and the battery life itself tends to shorten.

Also, for example, Japanese Patent Application Laid-Open (kokai) No. 58-104140 discloses an Ag—Zn alloy serving as a sliding-contact material. The Ag—Zn alloy contains Zn in an amount of 1–10% by weight, at least one element selected from a group consisting of Te, Co, Ni, Cu, Ge, Ti, and Pb in a total amount of 0.5–1.0% by weight, and the balance Ag. Since Te, Co, Ni, Cu, Ge, Ti, and Pb oxidize more easily than does Zn, such an element(s) is contained in the sliding-contact material in an attempt to suppress oxidation of Zn so that the sliding-contact material maintains sulfurization resistance and lubricity and exhibits improved wear resistance and stable, low contact resistance. However, as in the case of the above Ag—Cu alloy, the contact resistance of this sliding-contact material is low at an early stage of use, but exhibits time-course variation.

Further, Japanese Patent Application Laid-Open (kokai) No. 8-260078 discloses Ag—Zn and Ag—Zn—Ni alloys serving as sliding-contact materials. Again, these sliding-contact materials exhibit low contact resistance, but cannot control a wear phenomenon to such a sufficient extent as to improve the life of a motor.

As described above, the conventional sliding-contact materials are not sufficiently compatible with recent household electrical appliances which are driven on a rechargeable battery. Recent household electrical appliances using a rechargeable battery, particularly headphone stereos, cameras, and electric razors, are required to enable continuous use over a long period of time even when a motor having low starting voltage and a rechargeable battery are used. Thus, there has been great demand for a sliding-contact material that enables realization of such products.

In view of the foregoing, an object of the present invention is to provide a sliding-contact material whose alloy composition does not contain an environmentally detrimental substance such as Cd, which exhibits excellent contact resistance, whose electrical functions are good and free of time-course variation, and whose wear resistance practically compares with that of conventional sliding-contact materials, as well as to extend the life of a small-sized direct current motor through use of the sliding-contact material having such excellent characteristics in a commutator thereof.

SUMMARY OF THE INVENTION

The inventors of the present invention carried out extensive studies, and as a result, solved the above problems through control of the compositions of Ag—Zn—Pd and Ag—Zn—Pd—Cu alloys, which basically contain Ag as a main component. The inventors controlled the contents of Zn and Pd or those of Zn, Pd, and Cu with respect to the Ag content so as to obtain alloy structures in which these metals are present in the Ag a phase in the form of complete solid solution. A sliding-contact material having the thus-obtained alloy structure was found to maintain low contact resistance, to be free of time-course variation, and to have improved wear resistance.

Through integration of Zn and Pd into Ag or integration of Zn, Pd, and Cu into Ag in appropriate amounts and in the form of solid solution, the following characteristics are obtained. First, the presence of these metals in the form of solid solution enables Ag to harden without impairment in electrical conductivity, thereby imparting appropriate hardness to the resulting contact material. Second, Zn or Cu present in Ag in the form of solid solution forms an appropriate oxide film (oxide band), i.e., ZnO or CuO, on the surface of contact material during sliding. This oxide film serves as lubricant for a contact portion, thereby decreasing frictional resistance and improving wear resistance.

The presence of Pd plays an important role in improvement of wear resistance, which is a second feature of the sliding-contact material of the present invention. Conventional sliding-contact materials; for example, Ag—Zn and Ag—Cu alloys, also attempt to control a wear phenomenon through formation of an oxide band, such as ZnO or CuO. However, when the conventional alloys are left in the air, with time ZnO or CuO is excessively generated at a contact portion, resulting in an increase in contact resistance. Particularly, when CuO, whose electrical conductivity is low, is generated in an excessive amount, contact resistance increases significantly. Even in the case of electrically conductive ZnO, generation of excessive ZnO causes an increase in contact resistance. By contrast, in the sliding-contact material of the present invention, the presence of Pd suppresses excessive oxidation of Zn, or Zn and Cu present in Ag in the form of solid solution. More specifically, in the sliding-contact material of the present invention, the presence of Pd suppresses excessive oxidation of Zn or Cu to thereby prevent an increase in contact resistance which would otherwise result from an oxide band; nevertheless, ZnO or CuO is generated to such an extent as to effect lubrication during sliding, thereby improving wear resistance. As described above, the inventors achieved an improvement in contact resistance characteristics and wear resistance without addition of Cd, relative to the case of conventional Ag—Zn and Ag—Cu alloys which cannot achieve such an improvement.

The composition of a sliding-contact material having the above features and according to the present invention will next be described. According an embodiment of the invention, a sliding-contact material assumes the form of a Ag—Zn—Pd alloy containing 0.1–3.0% by weight Zn, 0.1–1.5% by weight Pd, and the balance Ag.

According another embodiment of the invention, a sliding-contact material assumes the form of a Ag—Zn—Pd—Cu alloy containing 0.1–3.0% by weight Zn, 0.1–1.5% by weight Pb, 0.1–3.0% by weight Cu, and the balance Ag.

Through employment of a Zn content of 0.1 to less than 1.0% by weight, priority can be given to maintenance of low contact resistance. Through employment of a Zn content of 1.0 to 3.0% by weight, priority can be given to the improvement of wear resistance. Thus, the characteristics of the sliding-contact material of the present invention can be selectively utilized through control of the Zn content. At a Zn content of less than 0.1% by weight, the improvement of wear resistance and maintenance of required contact resistance characteristics cannot be achieved. At a Zn content in excess of 3.0% by weight, contact resistance increases. When priority is to be given to the improvement of wear resistance, addition of Cu is quite effective. A Cu content of 0.5–2.5% by weight achieves the greatest improvement of wear resistance. As in the case of the Zn content, at a Cu content of less than 0.1% by weight, the improvement of wear resistance and maintenance of required contact resistance characteristics cannot be achieved. At a Cu content in excess of 3.0% by weight, wear resistance is improved, but contact resistance increases. At a Pd content of less than 0.1% by weight, the effect of Pd against excessive oxidation of Zn and Cu is lost. At a Pd content in excess of 1.5% by weight, when the material is left in the air, Pd itself is apt to be oxidized and forms an oxide film, thus increasing contact resistance. Addition of Pd is most effective at a Pd content of 0.5–1.0% by weight.

Further, it has been found that through addition of Ni to an Ag—Zn—Pd or Ag—Zn—Pd—Cu alloy, a sliding-contact material exhibits low contact resistance, wear resistance, and excellent dimensional stability. Ag—Zn alloys are known to show age softening. This softening phenomenon does not influence a sliding characteristic in actual use, but has a significant effect on dimensional stability during processing of a sliding-contact material; for example, during manufacture of a composite clad material. Particularly, in the case of application to a small-sized motor, a dimensional error induced during processing causes a problem during motor assembly. According to the invention, in order to prevent the age softening phenomenon without impairment in low contact resistance and wear resistance of the above Ag—Zn—Pd or Ag—Zn—Pd—Cu alloy, Ni is finely dispersed within Ag, thereby providing a sliding-contact material that exhibits excellent dimensional stability during processing. Since Ni has difficulty existing within Ag in the form of solid solution, Ni is present within Ag in a finely dispersed state, in contrast to the case of Zn, Pd, or Cu. Dispersed Ni particles prevent age softening which would otherwise occur in Ag—Zn alloys, and further serve as lubricant to thereby contribute to the improvement of wear resistance.

The composition of a sliding-contact material containing Ni and according to the present invention will next be described. According to another embodiment of the invention, a sliding-contact material assumes the form of an Ag—Zn—Pd—Ni alloy containing 0.1–3.0% by weight Zn, 0.1–1.5% by weight Pb, 0.01 to less than 0.5% by weight Ni, and the balance Ag.

According to the invention as described in claim 4, a sliding-contact material assumes the form of a Ag—Zn—Pd—Cu—Ni alloy containing 0.1–3.0% by weight Zn, 0.1–1.5% by weight Pb, 0.1–3.0% by weight Cu, 0.01 to less than 0.5% by weight Ni, and the balance Ag.

At a Ni content of less than 0.01% by weight, age softening cannot be prevented. At a Ni content of not less than 0.5% by weight, Ni is segregated in a nonuniform manner. Further, during sliding, Ni particles dispersed on the surface of a contact form oxides, causing a local increase in contact resistance. A Ni content of 0.2–0.4% by weight is most effective against age softening and to some extent contributes to the improvement of wear resistance.

Further, according to the present invention, in order to provide better application to a commutator of a motor, a sliding-contact material of the present invention is used in the form of a composite clad material in which the sliding-contact material is embedded in a portion of a base material of Cu or a Cu alloy. The form of a composite clad material provides good solderability in soldering for electrical connection of the commutator as well as improved workability during formation into a predetermined shape of the commutator. Also, through employment of the form of a composite clad material, the thickness of the sliding-contact material of the invention to be embedded in a base material can be controlled according to a motor to be used. Thus, the expensive sliding-contact material can be limited to partial use, thereby yielding an economical advantage.

In the above composite clad material, an exposed portion of the embedded sliding-contact material is exposed to the atmosphere and is thus likely to corrode. Therefore, according to the present invention, in a composite clad material in which the sliding-contact material of the invention is embedded in a portion of a base material of Cu or an Cu alloy, at least a portion of the sliding-contact material is clad with Au or a Au alloy. Au or a Au alloy is known to be a good sliding-contact material that exhibits excellent corrosion resistance and low contact resistance, but is very expensive; therefore, using a large amount of Au or an Au alloy is economically disadvantageous. Thus, the sliding-contact material of the present invention is partially clad with Au or a Au alloy, thereby reducing cost and preventing corrosion of the material. Further, through application of such a composite clad material to a commutator of a motor, the motor can be run in good condition at an early stage of use by virtue of excellent contact-resistance characteristic of Au or a Au alloy. Even when the clad Au or Au alloy is destroyed due to wear, the motor can be used continuously, since the sliding-contact material of the invention is present underneath.

Further, the above so-called two-layer or three-layer composite clad material is applied to a commutator of a small-sized direct current motor. As a result, the small-sized direct current motor can be run under the following conditions: stable low contact resistance; less time-course variation; freedom from a problem caused by wear powder; and low starting voltage. Thus, there can be extended the life of the small-sized direct current motor itself, as well as the life of a rechargeable battery for powering the motor.

BRIEF DESCRIPTION OF DRAWINGS

FIG. 1 is a perspective view of a two-layer composite clad material; and

FIG. 2 is a perspective view of a three-layer composite clad material.

DETAILED DESCRIPTION OF PREFERRED EMBODIMENTS OF THE INVENTION

An embodiment of the present invention will next be described through use of Examples 1 to 18 shown below. Examples 1 to 18 have compositions shown in Table 1. Prior Art Examples 1 to 6 and Comparative Examples 1 and 2 denote sliding-contact materials used for comparison with the Examples (the Prior Art Examples and the Comparative Examples denote sliding-contact materials of commutators which the inventors have conventionally used). These sliding-contact materials having the respective compositions underwent melting, casting, facing, and rolling by groove mill to thereby be formed into 5.5 mm square bars. The square bars were heat-treated (conveyor furnace, 650° C., 250 mm/min) and were then drawn into round bars having a diameter of 2 mm.

TABLE 1

|  | Ag | Zn | Pd | Cu | Ni | Cd |
|---|---|---|---|---|---|---|
| Example 1 | Balance | 0.1 | 0.1 |  | 0.3 |  |
| Example 2 | Balance | 0.1 | 1.5 |  | 0.3 |  |
| Example 3 | Balance | 1.0 | 0.5 |  |  |  |
| Example 4 | Balance | 1.0 | 0.5 |  | 0.3 |  |
| Example 5 | Balance | 1.0 | 1.0 |  |  |  |
| Example 6 | Balance | 1.0 | 1.0 |  | 0.3 |  |
| Example 7 | Balance | 2.0 | 0.5 |  |  |  |
| Example 8 | Balance | 2.0 | 0.5 |  | 0.3 |  |
| Example 9 | Balance | 3.0 | 0.5 |  |  |  |
| Example 10 | Balance | 3.0 | 0.5 |  | 0.3 |  |
| Example 11 | Balance | 3.0 | 1.5 |  |  |  |
| Example 12 | Balance | 3.0 | 1.5 |  | 0.3 |  |
| Example 13 | Balance | 1.0 | 0.5 | 0.5 |  |  |
| Example 14 | Balance | 1.0 | 0.5 | 0.5 | 0.3 |  |
| Example 15 | Balance | 1.0 | 0.5 | 2.0 |  |  |
| Example 16 | Balance | 1.0 | 0.5 | 2.0 | 0.3 |  |
| Example 17 | Balance | 1.0 | 0.5 | 3.0 |  |  |
| Example 18 | Balance | 1.0 | 0.5 | 3.0 | 0.3 |  |
| Prior Art Example 1 | Balance |  |  |  |  |  |
| Prior Art Example 2 | Balance |  |  |  | 0.3 |  |

TABLE 1-continued

|  | Ag | Zn | Pd | Cu | Ni | Cd |
|---|---|---|---|---|---|---|
| Prior Art Example 3 | Balance | 0.9 |  |  |  | 1.0 |
| Prior Art Example 4 | Balance | 0.9 |  |  | 0.3 | 2.0 |
| Prior Art Example 5 | Balance |  |  | 0.5 | 0.3 |  |
| Prior Art Example 6 | Balance | 1.0 |  | 0.5 | 0.3 |  |
| Comparative Example 1 | Balance |  |  | 6.0 |  | 2.0 |
| Comparative Example 2 | Balance |  |  | 4.0 | 0.5 |  |

The test materials that assume the form of a round bar having a diameter of 2 mm and respectively have the compositions of Examples 1–18, Prior Art Examples 1–6, and Comparative Examples 1 and 2 were tested in the following manner. Each of the test materials and a round bar of Ag—Pd 50% by weight having a diameter of 2 mm were crossed and underwent an abrasion test under test conditions given below so as to measure the amount of wear (volume of wear).

The volume of wear was obtained under the following abrasion test conditions.

Abrasion Test Conditions

| Current | DC 170 mA |
|---|---|
| Load | 25 g |
| Rotational speed | 300 rpm |
| Amplitude | 0.5 mm |
| Temperature, humidity | 25° C., 50% RH |
| Number of cycles | 100,000 |
| Material for moving contact | Test material |
| Material for stationary contact | Ag-Pd 50% by weight |

Notably, in the test materials which had undergone the abrasion test, a transfer of material from the material of the moving contact (test material) to the material of the stationary contact (Ag—Pd 50% by weight) was observed. Since the shape of a worn portion of the material of the moving contact (test material) can be substantially approximated to an ellipsoid, the volume of wear of the worn portion was calculated by the following expression (1). The volume of wear was measured at 10 points for each of the sliding-contact materials, and an average volume of wear was calculated. Table 2 shows the results of calculation.

Volume of wear=4/3π×(length of major axis as viewed from above)×(length of minor axis as viewed from above)×(depth-of-wear×2)     (1)

TABLE 2

|  | Volume of wear ($\times 10^{-12}$ m$^3$) |  | Volume of wear ($\times 10^{-12}$ m$^3$) |
|---|---|---|---|
| Example 1 | 3.3 | Prior Art Example 1 | 2.6 |
| Example 2 | 3.0 | Prior Art Example 2 | 2.6 |
| Example 3 | 2.1 | Prior Art Example 3 | 2.3 |
| Example 4 | 2.0 | Prior Art Example 4 | 2.3 |
| Example 5 | 2.0 | Prior Art Example 5 | 2.3 |
| Example 6 | 2.0 | Prior Art Example 6 | 2.0 |
| Example 7 | 1.8 | Comparative Example 1 | 1.2 |
| Example 8 | 1.7 | Comparative Example 2 | 1.5 |
| Example 9 | 1.6 |  |  |
| Example 10 | 1.6 |  |  |
| Example 11 | 1.4 |  |  |
| Example 12 | 1.3 |  |  |
| Example 13 | 1.9 |  |  |
| Example 14 | 1.8 |  |  |
| Example 15 | 1.6 |  |  |
| Example 16 | 1.6 |  |  |
| Example 17 | 1.4 |  |  |
| Example 18 | 1.4 |  |  |

An embodiment of a composite clad material according to the present invention will next be described. The perspective view of FIG. 1 shows a so-called two-layer composite clad material in which a sliding-contact material according to any of the Examples is embedded in a portion of a base material of a Cu alloy. The perspective view of FIG. 2 shows a so-called three-layer composite clad material in which a sliding-contact material according to any of the Examples is embedded in a portion of a base material of a Cu alloy and in which a portion of the embedded sliding-contact material is clad with Au. FIGS. 1a, 2a, and 2b show single-strap composite clad materials, and FIG. 1b shows a double-strap composite clad material. In FIGS. 1 and 2, numeral 1 denotes the sliding-contact material of the invention; numeral 1' denotes an exposed portion of the sliding-contact material 1; numeral 2 denotes a base material of a Cu alloy; and numeral 3 denotes Au.

The above two-layer composite clad materials were manufactured through use of the sliding-contact materials exemplified herein and were measured for a time-course variation in contact resistance. The two-layer composite clad materials were allowed to stand under accelerated conditions to thereby be evaluated for a time-course variation in contact resistance. Specifically, the two-layer composite clad materials were allowed to stand in an atmosphere having a temperature of 60° C. and a humidity of 90% for 240 hours; in other words, the two-layer composite clad materials were aged so as to form an oxide film on the surface of each of the sliding-contact materials. Samples were measured for contact resistance before and after aging through use of a contact resistance measuring apparatus which employs a four-probe method using Pt probes and a contact load of 10 g. Each of the samples was measured for contact resistance at 100 points. Measurements were statistically processed by the following expression (2), yielding contact resistance for each sample.

$$\text{Contact resistance} = \exp\left(\frac{1}{100}\left(\sum_{i=1}^{100} \ln Ri\right)\right) \quad (2)$$

TABLE 3

|  | Contact resistance (mΩ) Aging |  |  | Contact resistance (mΩ) Aging |  |
|---|---|---|---|---|---|
|  | Before | After |  | Before | After |
| Example 1 | 2.6 | 10 | Prior Art Example 1 | 2.4 | 16 |
| Example 2 | 2.5 | 14 | Prior Art Example 2 | 2.9 | 20 |
| Example 3 | 2.6 | 18 | Prior Art Example 3 | 2.4 | 18 |
| Example 4 | 2.8 | 17 | Prior Art Example 4 | 2.5 | 20 |
| Example 5 | 2.9 | 20 | Prior Art Example 5 | 2.4 | 22 |
| Example 6 | 3.0 | 22 | Prior Art Example 6 | 2.5 | 24 |
| Example 7 | 3.1 | 34 | Comparative Example 1 | 2.7 | 97 |
| Example 8 | 3.4 | 36 | Comparative Example 2 | 2.9 | 250 |

TABLE 3-continued

|  | Contact resistance (mΩ) Aging | | Contact resistance (mQ) Aging | |
|---|---|---|---|---|
|  | Before | After | Before | After |
| Example 9 | 3.4 | 46 | | |
| Example 10 | 3.5 | 46 | | |
| Example 11 | 3.4 | 55 | | |
| Example 12 | 3.6 | 59 | | |
| Example 13 | 3.2 | 25 | | |
| Example 14 | 3.2 | 28 | | |
| Example 15 | 3.5 | 36 | | |
| Example 16 | 3.6 | 38 | | |
| Example 17 | 3.6 | 55 | | |
| Example 18 | 3.8 | 59 | | |

As seen from the test results of Tables 2 and 3, the sliding-contact materials having the compositions of the Examples have the following characteristics. As seen from Table 2, the sliding-contact materials of Examples 3 to 18 have wear resistance substantially similar to that of the Prior Art Examples and the Comparative Examples. As seen from Table 3, the composite clad materials made of the sliding-contact materials of the Examples are substantially similar in contact resistance as measured before aging to those of the Prior Art Examples and the Comparative Examples and are to some extent inferior in contact resistance as measured after aging to those of the Prior Art Examples, but do not show an extreme increase in contact resistance as measured after aging as in the case of the Comparative Examples 1 and 2. The contact resistance values of the Examples as measured after aging are impaired to some extent, but are sufficiently satisfactory in actual use. In Table 2, Examples 1 and 2 show wear resistance which is to some extent inferior to that of the Prior Art Examples and the Comparative Examples. However, a composite evaluation from the test results of Tables 2 and 3 indicates that the sliding-contact materials of Examples 1 and 2 have sufficiently satisfactory characteristics in terms of actual use.

Further, small-sized direct current motors were actually assembled through use of the above sliding-contact materials and were tested for durability. First is described the durability test that was conducted on the motors employing the sliding-contact materials of Examples 3 and 15 according to the invention and Prior Art Example 1. Two-layer composite clad materials as shown in FIG. 1 were manufactured through use of the sliding-contact materials having the compositions of Examples 3 and 15 and Prior Art Example 1. The thus-manufactured two-layer composite clad materials were formed into three-pole commutators. The resulting three-pole commutators were incorporated into the small-sized direct current motors. Durability test conditions:

| Voltage | 1.2 v |
| Torque | 15 g-cm |
| Direction of rotation | Counterclockwise as viewed from output shaft |
| Mode | 5-minute ON, 30-second OFF |
| Number of motors tested | 10 |

Table 4 shows steady-state current and rotational speed as measured for the motors at the initial stage of the above durability test and 500 hours later.

TABLE 4

|  | Initial stage | | 500 hours later | |
|---|---|---|---|---|
|  | Steady-state current (A) | Rotational speed (rpm) | Steady-state current (A) | Rotational speed (rpm) |
| Example 3 | 1.29 | 6830 | 1.33 | 6780 |
| Example 15 | 1.32 | 6710 | 1.37 | 6760 |
| Prior Art Example 1 | 1.31 | 6730 | 1.37 | 6730 |

As shown in Table 4, the motors employing the sliding-contact materials of Examples 3 and 15 are similar in contact resistance and durability to those of the motors employing the sliding-contact material of Prior Art Example 1, which contains Cd.

Table 5 shows the results of the durability test conducted on small-sized direct current motors employing the sliding-contact materials of Prior Art Examples 5 and 6, which do not contain Cd, and the sliding-contact materials of Examples 4 and 14. The incorporation of commutators into the motors and durability test conditions are similar to those of the above-described durability test; thus, description thereof is omitted.

TABLE 5

|  | Time elapsed before any one of 10 motors stopped first | Number of motors which went wrong before the elapse of 400 hours |
|---|---|---|
| Example 4 | Not less than 400 hours | 0 |
| Example 14 | Not less than 400 hours | 0 |
| Prior Art Example 5 | 260 hours | 2 |
| Prior Art Example 6 | 260 hours | 1 |

As shown in Table 5, of the ten motors employing the sliding-contact material of Prior Art Example 5, one motor stopped after 260 hours of operation, and another motor stopped after 380 hours of operation. Of the ten motors employing the sliding-contact material of Prior Art Example 6, one motor stopped after 260 hours of operation. These motors fail to satisfy a target life of 400 hours. By contrast, the ten motors employing the sliding-contact material of Example 4 or 14 all exhibited a life of not less than 400 hours.

The above-described test results can be summarized as follows. The sliding-contact materials of the Examples are alloys which do not contain Cd, but are similar in contact resistance and wear resistance to. sliding-contact materials which contain Cd. Also, the sliding-contact materials of the Examples compare practically with other conventional sliding-contact material s which do no t contain Cd. Further, the sliding-contact materials of the Examples, when incorporated into small-sized direct current motors, exhibit contact resistance and wear resistance similar to those exhibited by sliding-contact materials which contain Cd, and apparently impart a longer life to the motors as compared to other conventional sliding-contact materials which do not contain Cd.

As described above, the sliding-contact material according to the present invention has an alloy composition which does not contain an environmentally detrimental substance such as Cd, can maintain low contact resistance, exhibits good electrical functions free of time-course variation, and further exhibits wear resistance which compares practically with that exhibited by conventional sliding-contact materials. Particularly, when applied to a household electrical appliance equipped with a small-sized direct current motor powered by a rechargeable battery, the sliding-contact material maintains low contact resistance and enables the motor to be run at low starting voltage. Thus, a motor employing the sliding-contact material of the invention can be continuously used over a long period of time in contrast to a motor employing a conventional sliding-contact material. Further, the life of a rechargeable battery for powering a motor can be extended.

What is claimed is:

1. A commutator material for a small-sized direct current motor employed for a sliding element for electrical switching through a rotary sliding element relative to a brush, said material being a Ag—Zn—Pd—Cu alloy consisting of 0.1–3.0% by weight Zn, 0.1–1.5% by weight Pd, 0.1–3.0% by weight Cu, and the balance Ag.

2. A composite clad material, characterized in that a material for a sliding contact as described in claim 1 is embedded in a portion of a base material of Cu or a Cu alloy.

3. A small-sized direct current motor whose commutator employs a composite clad material as described in claim 2.

4. A composite clad material, characterized in that a material for a sliding contact as described in claim 1 is embedded in a portion of a base material of Cu or a Cu alloy and that at least a portion of the material for a sliding contact is clad with Au or an Au alloy.

5. A small-sized direct current motor whose commutator employs a composite clad material as described in claim 4.

6. A commutator material for a small-sized direct current motor employed for a sliding element for electrical switching through a rotary sliding element relative to a brush, said material being a Ag—Zn—Pd—Ni alloy consisting of 0.1–3.0% by weight Zn, 0.1–1.5% by weight Pd, 0.01 to less than 0.5% by weight Ni, and the balance Ag.

7. A composite clad material, characterized in that a material for a sliding contact as described in claim 6 is embedded in a portion of a base material of Cu or a Cu alloy.

8. A small-sized direct current motor whose commutator employs a composite clad material as described in claim 7.

9. A composite clad material, characterized in that a material for a sliding contact as described in claim 6 is embedded in a portion of a base material of Cu or a Cu alloy and that at least a portion of the material for a sliding contact is clad with Au or an Au alloy.

10. A small-sized direct current motor whose commutator employs a composite clad material as described in claim 9.

11. A commutator material for a small-sized direct current motor employed for a sliding element for electrical switching through a rotary sliding element relative to a brush, said material being a Ag—Zn—Pd—Cu—Ni alloy consisting of 0.1–3.0% by weight Zn, 0.1–1.5% by weight Pd, 0.1–3.0% by weight Cu, 0.01 to less than 0.5% by weight Ni, and the balance Ag.

12. A composite clad material, characterized in that a material for a sliding contact as described in claim 11 is embedded in a portion of a base material of Cu or a Cu alloy.

13. A small-sized direct current motor whose commutator employs a composite clad material as described in claim 12.

14. A composite clad material, characterized in that a material for a sliding contact as described in claim 11 is embedded in a portion of a base material of Cu or a Cu alloy and that at least a portion of the material for a sliding contact is clad with Au or an Au alloy.

15. A small-sized direct current motor whose commutator employs a composite clad material as described in claim 14.

* * * * *